United States Patent
Matsushita et al.

[11] Patent Number: 5,733,078
[45] Date of Patent: Mar. 31, 1998

[54] DRILLING AND THREADING TOOL

[75] Inventors: Takayuki Matsushita, Toyokawa; Tugio Hayashi, Toyohashi, both of Japan

[73] Assignee: OSG Corporation, Toyokawa, Japan

[21] Appl. No.: 665,696

[22] Filed: Jun. 18, 1996

[51] Int. Cl.⁶ ............................. B23C 3/00; B23G 5/20
[52] U.S. Cl. ..................... 409/74; 408/222; 470/198; 470/199
[58] Field of Search ................... 409/66, 74, 65, 409/71, 73, 75, 76; 470/198, 199, 105; 408/22, 30, 59, 218, 219, 220, 221, 222, 224; 72/70, 71, 112, 114, 118, 120; 407/54, 20, 24, 29, 58, 59, 61, 63

[56] References Cited

U.S. PATENT DOCUMENTS

| | | | |
|---|---|---|---|
| 1,836,954 | 12/1931 | Bryant | 470/105 |
| 4,651,374 | 3/1987 | Turchan | 10/140 |
| 4,761,844 | 8/1988 | Turchan | 407/74 X |
| 4,831,674 | 5/1989 | Bergstrom et al. | 409/74 X |
| 4,913,604 | 4/1990 | Zaengerle | 409/74 |
| 4,930,949 | 6/1990 | Giessler | 408/222 |
| 4,943,191 | 7/1990 | Schmitt | 408/1 R |
| 5,080,538 | 1/1992 | Schmitt | 409/66 |
| 5,413,438 | 5/1995 | Turchan | 409/66 |
| 5,429,459 | 7/1995 | Palm | 409/66 |

FOREIGN PATENT DOCUMENTS 3-184721  8/1991  Japan .

*Primary Examiner*—William R. Briggs
*Attorney, Agent, or Firm*—Oliff & Berridge PLC

[57] ABSTRACT

A drilling and thread-milling tool for generating an internal thread in a workpiece, including a proximal shank portion attachable to a driving device for rotating the tool about a rotation axis thereof, and a distal cutting portion rotated with the shank portion about the rotation axis for generating the internal thread while the distal cutting portion is moved relative to the workpiece. The cutting portion has at least one thread-milling tooth on an outer circumferential surface thereof, each tooth having a configuration similar to that of the internal thread, and a height substantially equal to a depth of the internal thread. The cutting portion further has at least one end-cutting edge on a distal end face thereof so as to extend in a radial direction thereof, each end-cutting edge having a maximum diameter which is larger and smaller than a minor diameter and a major diameter of the thread-milling tooth.

31 Claims, 11 Drawing Sheets

DRILLING AND THREADING TOOL

BACKGROUND OF THE INVENTION

1. Field of the Invention

The present invention relates generally to a thread-milling tool for generating an internal or female thread, and more particularly to a drilling and thread-milling tool capable of threading a hole without a pre-drilling operation prior to a thread-milling operation, or capable of performing simultaneous drilling and thread-milling processes.

2. Discussion of the Related Art

For generating an internal or female thread or forming a threaded hole in a workpiece, there is known a thread-cutting tool which has thread-cutting teeth at its outer circumference. The thread-cutting teeth have a configuration corresponding to that of the internal thread to be formed on the inner surface of the hole to be threaded. The thread-cutting tool is attached to a spindle of a numerically controlled milling machine or machining center or complex, so that the tool is rotated about its axis and moved in the axial direction relative to the workpiece in timed relation with the rotary motion, with a certain amount of stock removal from the inner surface of the hole of the workpiece, to thereby thread the hole.

An example of such a thread-cutting tool is disclosed in U.S. Pat. No. 4,761,844. This thread-cutting tool is also used to cut a hole to be threaded (or finish an already formed hole to a desired diameter), by rotary and axial motions thereof relative to the workpiece. The hole is then threaded by a combination of simultaneous rotary, axial and orbital motions of the tool. The orbital motion of the tool is a movement of the axis of the tool about the centerline of the hole, namely, along a circle whose center lies on the centerline of the hole. With these combined rotary, axial and orbital motions of the tool, an internal thread is cut on the inner surface of the hole. Thus, this thread-cutting tool can be used for cutting a hole as well as threading the hole.

The known thread-cutting tool (drilling and thread0cutting tool) indicated above has end-cutting edges formed at the foremost or distal free end for drilling a hole, and peripheral cutting edges extending from the end-cutting teeth in a direction substantially parallel to the axial direction toward the other end of the tool. The outer diameter of the end-cutting edges and the diameter of the peripheral cutting edges are larger than the major diameter of the end-cutting teeth (diameter of the crest of the teeth). Therefore, the diameter of the portion of the threaded hole which portion is formed by the end-cutting edges and peripheral cutting edges is larger than the diameter of the major diameter of the thread formed by the thread-cutting teeth. Accordingly, the above-indicated portion of the threaded hole has a smaller wall thickness with respect to an edge of the workpiece when the threaded hole is formed near the edge. Since the wall thickness of the threaded hole should be sufficient to ensure the required strength, it is relatively difficult to form the threaded hole considerably near the edge of the workpiece where the above-indicated thread-cutting tool is used.

Further, the end-cutting edges provided at the foremost end of the known thread-cutting tool have a conical shape to provide a positive convexity angle or a negative concavity angle as generally provided on an ordinary drill, so that the bottom surface of the drilled hole is made downwardly concave having a conical shape. Accordingly, the thread cannot be formed over the entire depth of the hole, namely, down to point close to the bottom of the hole, since the concave recess should be provided at the bottom of the hole by the end-cutting edges formed at the foremost end of the tool.

SUMMARY OF THE INVENTION

The present invention was developed in the light of the prior art discussed above. It is therefore a first object of the present invention to provide a drilling and thread-milling tool which makes it possible to generate an internally threaded hole close to an edge of the workpiece.

It is a second object of this invention to provide a drilling and thread-milling tool which makes it possible to form an internal thread so that the thread ends at a point close to the bottom of a threaded hole.

The first object may be achieved according to a first aspect of the present invention, which provides a drilling and thread-milling tool for generating an internal thread in a workpiece, comprising: a proximal shank portion attachable to driving means for rotating the tool about a rotation axis thereof; and a distal cutting portion rotated with the shank portion about the rotation axis for generating the internal thread while the distal cutting portion is moved relative to the workpiece. The distal cutting portion has at least one thread-milling tooth on an outer circumferential surface thereof. Each thread-milling tooth has a configuration corresponding or similar to that of the internal thread, and has a height substantially equal to a depth of the internal thread. The distal cutting portion further has at least one end-cutting edge on a distal end face thereof so as to extend in a radial direction thereof. Each end-cutting edge has a maximum diameter which is larger than a minor diameter of the thread-milling tooth and is smaller than a major diameter of the thread-milling tooth.

The drilling and thread-milling tool constructed according to the present invention makes it possible to form a threaded hole close to an edge of the workpiece, or reduce the minimum required wall thickness between the major diameter of the generated thread and the edge of the workpiece, since the maximum diameter of each end-cutting edge is larger than the minor diameter of the thread-milling tooth and is smaller than the major diameter of the thread-milling tooth, in particular, since the maximum diameter of the end-cutting edge is smaller than the major diameter of the thread-milling tooth.

The second object may be achieved according to a preferred form of this invention, wherein the above-indicated at least one end-cutting edge is contiguous with one of the above-indicated at least one thread-milling tooth which is closest to the distal end face of the distal cutting portion in an axial direction of the tool.

In the above preferred form of the tool, each radially extending end-cutting edge is formed continuously or contiguously with the foremost thread-milling tooth close to the distal end face of the cutting portion. In other words, no axially extending peripheral cutting edges are present at the distal end of the tool, or between the end-cutting edge and the thread-milling tooth. Accordingly, the length of the thread that can be formed by the present tool is increased by a distance equal to the axial dimension of the conventionally provided peripheral cutting edges, so that the formed thread ends at a point considerably close to the bottom of the threaded hole.

The distal cutting portion may further have at least one peripheral cutting edge which extends in a direction substantially parallel to an axial direction of the tool and which is contiguous with one of the above-indicated at least one thread-milling tooth which is closest to the distal end face of the distal cutting portion in the axial direction. In this case, each end-cutting edge is contiguous with the at least one peripheral cutting edge.

In another preferred form of the invention, the above-indicated at least one end-cutting edge comprises at least one end-cutting edge whose inner end is located close to the rotation axis in the radial direction of the cutting portion of the tool. The present tool having an end-cutting edge or edges radially extending close to the rotation axis makes it possible to eliminate a pre-drilling process prior to a thread-milling process. Namely, the present tool does not require the workpiece to have an already formed hole such as a hole formed during casting of the workpiece, or eliminate a pre-drilling operation to enlarge such an already formed hole to a desired diameter. In other words, the present tool is capable of performing both a drilling operation by the end-cutting edge or edges and a thread-milling operation by the thread-milling tooth or teeth. The drilling operation is effected during an axial movement of the tool to a desired drilling depth while the tool is rotated about its axis, and the thread-milling operation is then effected during an orbital motion of the rotating tool about the centerline of the drilled hole by at least one orbit while the tool is axially moved.

The above-indicated at least one thread-milling tooth may consist of at least two thread-milling teeth. Where the foremost thread-milling tooth is contiguous with the end-cutting edge, the provision of at least two thread-milling teeth is essential since the foremost thread-milling tooth is incomplete in shape because the maximum diameter of the end-cutting edge is larger and smaller than the minor and major diameters of the foremost thread-milling tooth, and the tread-cutting tooth next to the foremost thread-milling tooth is complete in shape and can be used to generate a thread having a desired shape or configuration.

In a further preferred form of this invention, the above-indicated at least one thread-milling tooth may consist of a plurality of thread-milling teeth provided on the circumferential surface of the distal cutting portion such that the thread-milling teeth are equally spaced apart from each other in an axis direction of the tool. This drilling and thread-milling tool is useful to generate a relatively long thread with high efficiency, in a pre-drilling fashion such that a drilling operation is first performed by an axial movement of the tool rotating about its axis, to drill a hole to a desired depth (or enlarge an already formed hole), and a thread-milling operation is then performed by at least one orbit of the rotating tool about the centerline of the drilled hole (enlarged hole), without axially moving the tool over the entire length of the hole. In this case, the number of .orbits of the tool about the centerline of the hole can be made relatively small owing to the thread-milling teeth formed over a certain length of the cutting portion. Further, the present tool permits improved thread-milling accuracy, irrespective of some degree of deflection of the tool at its distal end potion.

Where the above-indicated at least one peripheral cutting edge may be provided by a foremost thread-milling tooth which is closest to the distal end face of the distal cutting portion in an axial direction of the tool. Namely, the peripheral cutting edge may be formed by removing a crest portion of the foremost thread-milling tooth, which crest portion includes a crest of the foremost thread-milling tooth. The crest portion is removed by cutting in a plane of a cylindrical surface of a cylinder having an axis parallel to the rotation axis. In this case, the peripheral cutting edge does not have an adverse effect on the thread to be cut by the following thread-milling tooth, since the groove formed by the peripheral cutting edge is located within the groove cut by the thread-milling tooth. The present tool is therefore useful to generate a threaded hole in a simultaneous drilling and thread-milling fashion such that a drilling operation to drill a hole and a thread-milling operation to generate an internal thread on the surface of the hole are simultaneously performed by the end-cutting and peripheral cutting edges and the thread-milling tooth, by an axial movement of the tool rotating about its axis and an orbital motion of the rotating tool about the centerline of the hole in timed relation with the axial movement.

In a yet further preferred form of this invention, the above-indicated at least one thread-milling tooth comprises a plurality of thread-milling teeth provided in a distal end portion of the outer circumferential surface of the distal cutting portion such that the plurality of thread-milling teeth are equally spaced apart from each other in an axis direction of the tool. The height dimensions of crests of the plurality of thread-milling teeth as measured from roots of the teeth are determined so as to increase in an axial direction from the distal end face of the distal cutting portion toward the proximal shank portion. According to this arrangement, the cutting load acting on the distal cutting portion of the tool during axial movement of the tool relative to the workpiece is distributed to the two or more thread-milling teeth provided at the distal end portion of the tool, without the load being concentrated on the foremost thread-milling tooth. Accordingly, the surface finish of the generated thread is significantly improved, and the expected life expectancy of the tool is prolonged.

In still another preferred form of the invention, each one end-cutting edge has a positive concavity angle with respect to a plane perpendicular to the rotation axis of the tool, such that an inner end of the end-cutting edge as viewed in the radial direction of the distal cutting portion is not offset from an outer end of the end-cutting edge as viewed in the radial direction, in an axial direction of the tool from the shank portion toward the distal cutting portion. In the present case, the bottom surface of the threaded hole is not concaved, but is made flat or convex, so that the thread can be formed close to the bottom wall of the hole. The positive concavity angle may be zero, and is preferably selected within a range between 1° and 10°.

In yet another preferred form of the above-indicated at least one thread-milling tooth and the above-indicated at least one end-cutting edge are formed of a material selected from the group consisting of: high-speed tool steels; micrograin cemented carbides; cemented carbides; cermets; ceramics; sintered diamond; and sintered CBN (cubic boron nitride). Alternatively, the thread-milling tooth and end-cutting edge may be coated with at least one layer of a material selected from the group consisting of: carbide of Ti; a mixture of carbide and nitride of Ti; aluminum nitride of Ti; diamond; and CBN (cubic boron nitride). The use of the materials indicated above assures a relatively long service life of the tool.

Preferably, the tool has a coolant feed passage formed through the proximal shank portion and distal cutting portion such that at least portion of the passage in the extending through the shank portion is aligned with the rotation axis of the tool. The coolant feed passage may be open in a central area of the distal end face of the cutting portion, or may be branched into two lines which are open in the distal end face, at positions ahead of the end-cutting edge or edges as viewed in the rotating direction of the tool.

BRIEF DESCRIPTION OF THE DRAWINGS

The above and other objects, features, advantages and technical and industrial significance of this invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
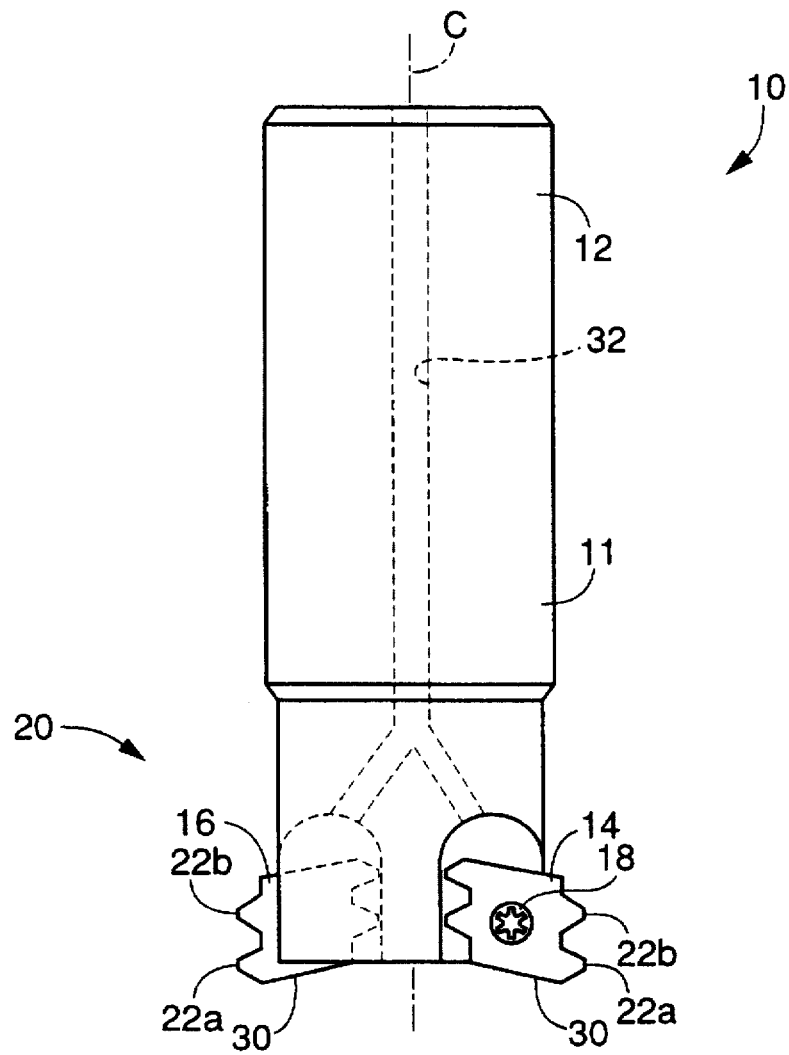
FIG. 1 is a front elevational view showing a drilling and thread-milling tool having two thread-milling teeth constructed according to one embodiment of the present invention.
Figure 2:
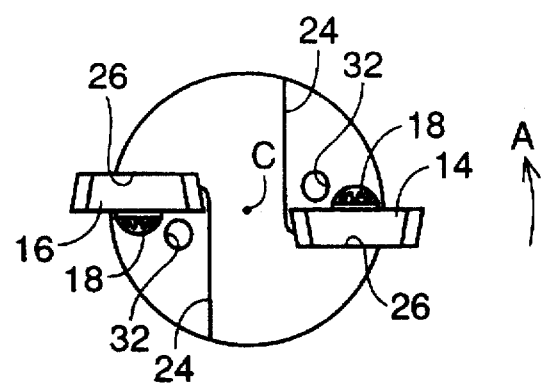
FIG. 2 is a bottom plan view of the drilling and thread-milling tool of FIG. 1.

Referring first to the front elevational view of FIG. 1 and the bottom plan view of FIG. 2, there is shown one embodiment of a drilling and thread-milling tool of this invention. The drilling and thread-milling tool, which is indicated generally it 10 in FIG. 1, has a cylindrical tool body 11 including a proximal portion in the form of a shank portion 12, and a distal portion in the form of a cutting portion 20. The proximal shank portion 12 is adapted to be removably attached to and clamped by a spindle of a machine tool such as a numerically controlled (NC) milling machine. The distal cutting portion 20 carries two cutting inserts 14, 16 removably fixed thereto by respective screws 18. The screws 18 function as fixing means for fixing the cutting inserts 14, 16 to the distal cutting portion 20.

The two cutting inserts 14, 16 have the same shape or configuration, and are formed of a suitable wear-resistant material selected from among cemented carbides, micrograin cemented carbides, cermets, ceramics, sintered diamond, and sintered CBN (cubic boron nitride), for example. Alternatively, the inserts 14, 16 may consist of a body of a suitable material and one or more coating layers of a material selected from among carbide of Ti, a mixture of carbide and nitride of Ti, aluminum nitride of Ti, diamond or CBN, for example. Each cutting insert 14, 16 has two thread-milling teeth, namely, a lower thread-milling tooth 22a and an upper thread-milling teeth 22b, which have a substantially triangular or trapezoid shape as seen in FIG. 1, which shape corresponds to a shape of a thread to be cut by the teeth 22a, 22b. The two teeth 22a, 22b protrude from the outer circumferential surface of the cutting portion 20 and are spaced from each other in the axial direction of the tool 10 when the teeth 22a, 22b are fixed in place.

While the above description of each insert 14, 16 refers to only two thread-milling teeth 22a, 22b, for easy understanding, the insert 14, 16 actually have two pairs of thread-milling teeth 22a, 22b disposed symmetrically with respect to its center at which the insert 14, 16 is fixed by the screw 18. When one pair of the inserts 22a, 22b is worn out, the insert 14, 16 is rotated through 180° about its center, so that the other pair may be used. However, the provision of the two pairs of thread-milling teeth 22a, 22b is not essential.

The distal cutting portion 20 has two straight flutes 24 formed so as to extend from the distal end toward the proximal end in the axial direction of the tool 10, such that the two straight or axially extending flutes 24 are spaced apart by 180° from each other in the circumferential direction of the tool 10. Each straight flute 24 is defined by two mutually perpendicular surfaces, one of which provides a mounting seat 26 close to the distal end. The cutting inserts 14, 16 are fixed to the mounting seats 26 of the corresponding straight flutes 24, such that the two thread-milling teeth 20a, 20b partially protrude from the outer circumference of the cutting portion 20. The straight flutes 24 also function as grooves for facilitating the removal of cutting chips produced by the teeth 20a, 20b. In this respect, it is noted that each mounting seat 26 is provided on one of the above-indicated two surfaces of the flute 24 which is on the trailing side as viewed in the rotating direction of the tool 10 indicated by arrow A in FIG. 2.

Figure 3:
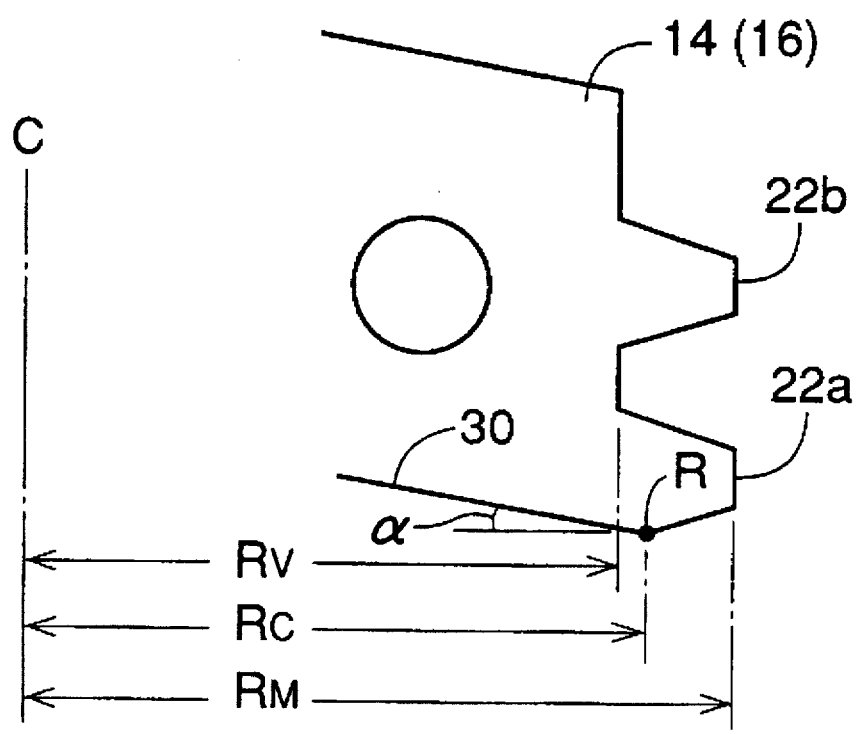
FIG. 3 is an enlarged view for explaining the configurations of the thread-milling teeth of the tool of FIG. 1 and end-cutting edges contiguous with the thread-milling teeth.

Each of the thread-milling teeth 20a, 20b provided on each cutting insert 14, 16 has a substantially triangular shape, more precisely, trapezoid shape as indicated in FIG. 3, which is similar to the shape of a groove of a thread to be formed by the teeth 20a, 20b. The tooth 20a, 20b has a crest which determines the diameter of the root of the thread to be formed, namely, the major diameter of the thread, and a root which determines the diameter of the crest of the thread, namely, the minor diameter of the thread. That is, the depth between the root and crest of the tooth 20a, 20b is equal to the depth of the thread measured perpendicular to the hole to be threaded.

As also shown in FIG. 3, each of the two cutting inserts 14, 16 has also an end-cutting edge 30 contiguous with the lower thread-milling tooth 20a and located at the foremost or distal end of the cutting portion 20. The end-cutting edge 30 is formed straight or curved so as to extend in the radial direction of the tool 10, for drilling a hole during a rotary motion of the tool 10 about its axis C and an axial movement of the same relative to the workpiece. More precisely explained, the end-cutting edges 30, 30 of the two inserts 14, 16 are provided to drill a hole or enlarge or finish an already formed hole to a desired diameter. Accordingly the end-cutting edges 30 are not provided near the axis of the tool 10.

Each end-cutting edge 30 has a positive concavity angle $\alpha$, as indicated in FIG. 3. That is, the end-cutting edge 30 is inclined by an angle α with respect to a plane perpendicular to the rotation axis C such that the end-cutting edge 30 approaches toward the shank portion 12 in the axial direction as the edge 30 extends in the radially inward direction of the cutting portion 20, from a point of boundary R thereof with the lower thread-milling tooth 20a, toward the rotation axis C of the tool 10. The point of boundary R determines the outside diameter of the end-cutting edge 30. Although the concavity angle α may be zero, it is preferably selected within a range between 1° and 10°. This positive concavity angle angle α is contrary to the negative concavity angle or a positive convexity generally provided on common drills. The concavity angle is positive where the radially inner end of the end-cutting edge 30 is offset from the radially outer end in the axial direction from the distal end toward the proximal end of the tool 10. In this application, however, the concavity angle is considered positive even when the angle α is zero.

Each thread-milling insert 14, 16 is formed and dimensioned such that the outside diameter of the corresponding end-cutting edge 30 determined by the point of boundary R as indicated above is larger than the diameter of the root of the thread-milling teeth 20a, 20b and is smaller than the diameter of the crest of the teeth 20a, 20b. In other words, the maximum diameter of the end-cutting edges 30 is larger than the minor diameter of the teeth 20a, 20b and smaller than the major diameter of the teeth 20a, 20b. Described in detail, the point of boundary R between the end-cutting edge 30 and the lower thread-milling tooth 20a is located between the root and crest of the teeth 20a, in the radial direction of the tool 10. That is, a radial distance $R_V$ of the end-cutting edge 30 measured in the radial direction from the axis C of the tool 10 to the point of boundary R when the appropriate insert 14, 16 is mounted on the mount 24 in place is larger than a minor radius $R_V$ of the teeth 20a, 20b and is smaller than a major radius $R_M$ of the teeth 20a, 20b. The minor radius $R_V$ is a half of the major diameter (diameter of of the crest) of the teeth 20a, 20b, while the major radius $R_M$ is a half of the minor diameter (diameter of the root) of the teeth 20a, 30b. Thus, the thread-milling inserts 14, 16 are formed, dimensioned and positioned on the cutting portion 20 so as to satisfy an inequality $R_V < R_C < R_M$. Thus, the lower thread-milling tooth 20a is not completely trapezoid corresponding to the shape of the thread, while the upper thread-milling tooth 20b is completely trapezoid.

The tool body 11 has a coolant feed passage 32 formed therethrough, which is aligned with the rotation axis. C of the shank portion 12 and which is branched or bifurcated at a point close to the point of boundary between the shank and cutting portions 12, 20. The coolant feed passage 32 is open in the proximal end face (upper end as viewed in FIG. 1) of the shank portion 12, and is also open in the straight flutes 24 at the bifurcated ends, as indicated in the bottom plan view of FIG. 2. The thread-milling teeth 20a, 20b and the end-cutting edges 30, 30 are lubricated by a coolant fed through this coolant feed passage 32. It is noted that the bifurcated ends of the passage 32 are open in the straight flutes. 24, at positions which are ahead of the teeth 20a, 20b and edges 30, 30 in the rotating direction A of the tool 10.

In use, the present drilling and thread-milling tool 10 is removably attached to the spindle of a machine tool such as an NC milling machine, as mentioned before. One typical application of the tool 10 will be described in detail by reference to FIGS. 4 and 5. In this example, the tool 10 is used to form an internal thread 42 on the inner surface of a hole which is formed by enlarging a hole already formed in a workpiece 44. The diameter of this already formed hole is smaller than the desired diameter of a hole to be threaded. Namely, a major diameter 2R1 of the thread 42 is larger than the diameter of the hole already formed in the workpiece 44. To generate an intended threaded hole in the workpiece 44, therefore, the already formed hole should be enlarged to the desired diameter (equal to the desired major diameter of the thread 42), and the thread 42 should be formed on the inner surface of the thus enlarged hole. The machine tool and the present drilling and thread-milling tool 10 are capable of simultaneously performing a process of enlarging the already formed hole and a process of threading the thus enlarged hole.

Figure 4:
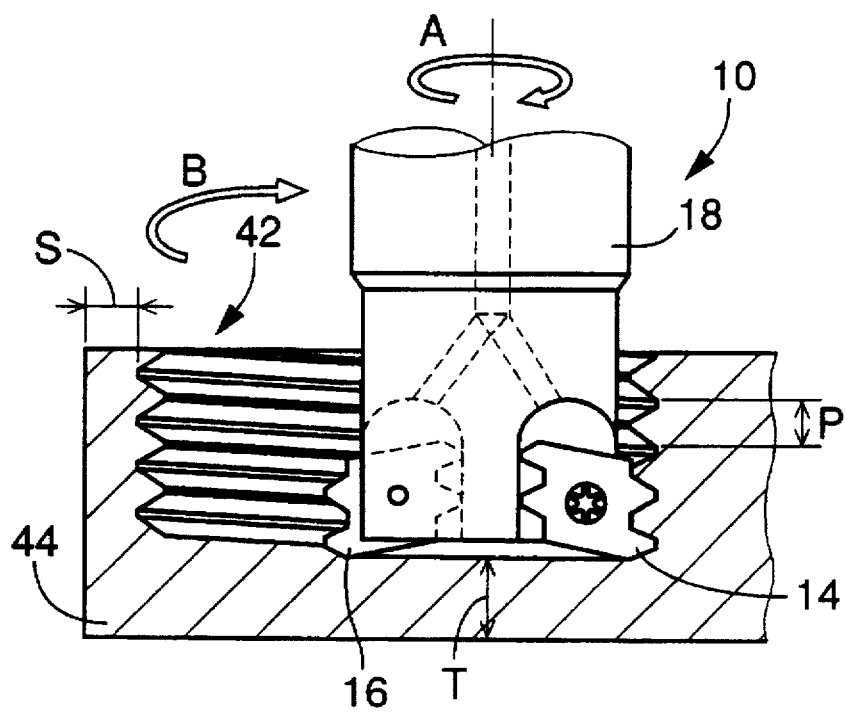
FIG. 4 is an elevational view partly in cross section showing a drilling and thread-milling operation on a workpiece by the tool of FIG. 1.
Figure 5:
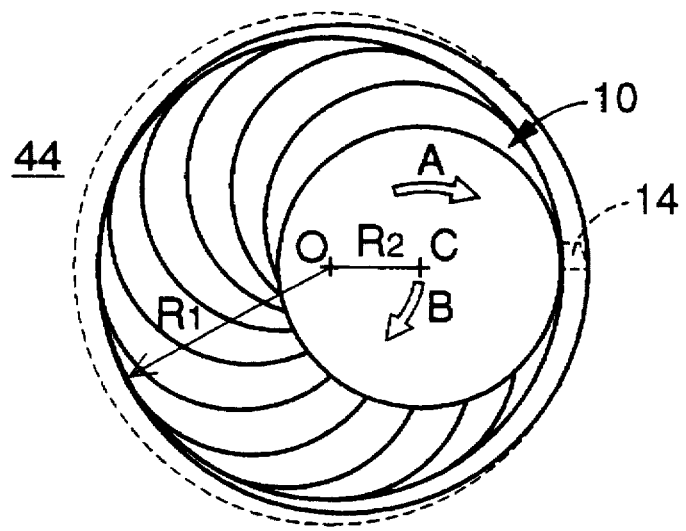
FIG. 5 is a top plan view showing the drilling and thread-milling operation of FIG. 4.

Prior to starting the machining operation on the workpiece 44, the tool 10 should be positioned such that the rotation axis C extends in a direction substantially parallel to the vertical with respect to the upper surface of the workpiece 44. The processes of enlarging the already formed hole and forming the thread 42 are simultaneously performed by a combination of three motions of the tool 10, namely, a rotary motion of the tool 10 about the axis C in the direction A, an orbital motion of the tool 10 about a centerline O of the hole or thread 42 to be formed, and an axial motion of the tool 10 in the axial direction parallel to the axis C such that a distance of the axial motion per one complete orbit (an orbit of 360) is equal to a pitch P of the thread 42. The orbital motion takes place in a direction B as indicated in FIGS. 3 and 4 where the thread 42 is a right-hand thread. As indicated in FIG. 5, a circle along which the axis C of the tool 1 is rotated about the centerline O during the orbital motion has a radius R2 which is equal to ($R1-R_V$), where R1 represents a major radius of the thread 42 while $R_V$ represents the minor radius of the teeth 20a, 20b as explained above. With the rotating tool 10 with the thread-milling inserts 14, 16 being axially advanced while the axis C is rotated about the centerline O, the already formed hole in the workpiece 44 is enlarged by the end-cutting edges 30, while at the same time the thread 42 is formed by the thread-milling teeth 20a, 20b such that the pitch P is equal to the axial advancing distance of the teeth 20a, 20b per one complete rotation of the axis C about the centerline O. Thus, the thread 42 is formed on the inner surface of the enlarged hole as the tool 10 is axially advanced in timed relation with the orbital motion of the axis C.

It will be understood from the above explanation that the present drilling and thread-milling tool 10 does not require a drilling operation to enlarge the already formed hole, prior to and independently of a thread-milling operation to form the thread 42. In other words, the present tool 10 when used on the machine capable of effecting the orbital motion of the tool 10 permits simultaneous drilling and thread-milling operations in one axial path of the tool 10. Therefore, the tool 10 contributes to reduction in the overall machining time to generate a threaded hole, and eliminates a non-productive time which would be required to change the working tool from a drilling tool to a thread-milling or tapping tool. Thus, the present drilling and thread-milling tool 10 assures significantly improved efficiency in forming the thread 42. Further, the same tool 10 permits the thread 42 to be formed with different diameters, yet with improved efficiency, provided the shape and pitch P of the thread 42 are the same.

In addition, the drilling and thread-milling tool 10 according to the present embodiment is effective to minimize a wall thickness S (FIG. 4) between the major diameter (diameter of the root) of the thread 42 and the edge of the workpiece, since the radial distance $R_C$ of the end-cutting edges 30 is smaller than the major radius $R_M$ of the thread-milling teeth 22a, 22b. The minimum required wall thickness S is determined solely by the tolerable minimum strength of the wall (which varies with the material) under a specific condition in which the threaded hole is used. That is, the minimum required wall thickness S need not be determined by taking into account also the outside diameter of the end-cutting edges 30, 30, since this outside diameter is smaller than the major diameter of the thread 42 (i.e., smaller than the diameter of the root of the thread 42).

Another advantage of the tool 10 of the present embodiment of FIGS. 1–5 accrues from the absence of peripheral cutting edges as provided on the conventional tool disclosed in U.S. Pat. No. 4,761,844 as discussed above and on a tool 94 according to an embodiment of FIGS. 13 and 14 which will be described. Described more specifically, the lower thread-milling tooth 20a at the foremost end of the tool body 11 (cutting portion 20) is formed contiguously with the end-cutting edge 30 such that the edge 30 extends in the radial direction of the tool body 11, and no peripheral cutting edge is provided adjacent to or contiguously with the end-cutting edge 30. This arrangement is effective to reduce the length of a non-threaded portion near the bottom wall of the threaded hole, and is accordingly effective to reduce a minimum required thickness T (FIG. 4) of the bottom wall of the hole. The minimum required bottom wall thickness T is determined solely by the tolerable minimum strength of the wall under the specific condition of use of the threaded hole, and need not be determined by also taking into account the non-threaded bottom portion of the threaded hole, since the length of this non-threaded hole portion is minimized.

The minimum required bottom wall thickness T can be further reduced owing to the flat or convex bottom surface of the threaded hole, since the end-cutting edges 30 have a positive concavity angle α, which may be zero and is preferably within the range between 1° and 10°, contrary to a negative concavity angle provided on the conventional drilling and thread-cutting tool, which causes a conical concave recess at the bottom portion of the hole.

A further advantage of the present tool 10 is provided by the coolant feed passage 32 which is open in the straight flutes 24, at the positions ahead of the thread-milling teeth 20a, 20b and end-cutting edges 30, 30 as viewed in the rotating direction of the cutting portion 20. This arrangement ensures a sufficient amount of supply of a coolant or cutting fluid to the cutting edges 20a, 20b, 30.

Other embodiments of this invention will be described. In these embodiments, the same reference numerals as used in the first embodiment will be used to identify the functionally corresponding elements, and redundant description of these elements will not be provided in the interest of brevity and simplification of the description.

Figure 6:
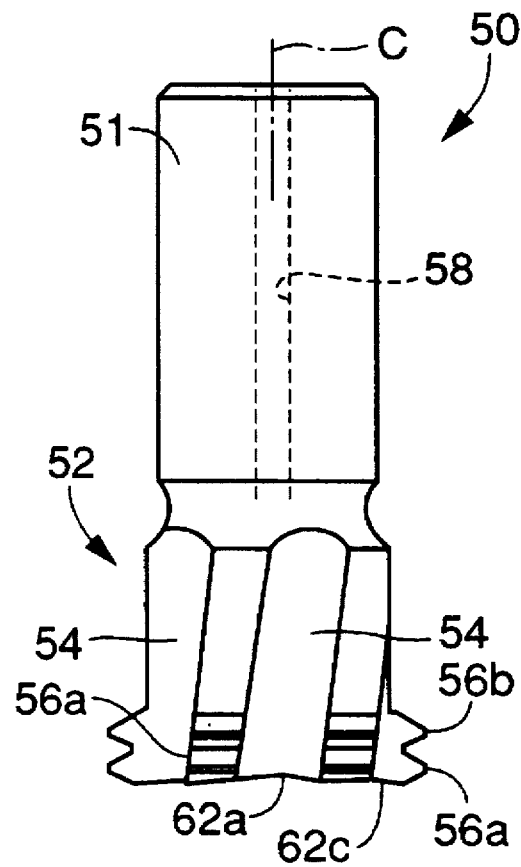
FIG. 6 is a view corresponding to that of FIG. 1, showing a drilling and thread-milling tool according to another embodiment of this invention.
Figure 7:
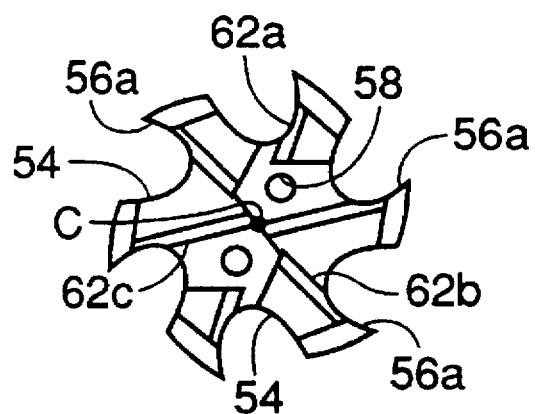
FIG. 7 is a bottom plan view of the drilling and thread-milling tool of FIG. 6.

Referring to FIGS. 6 and 7, there is shown a drilling and thread-milling tool 50 having two sets of thread-milling teeth 56a, 56b and three end-cutting edges 62a, 62b, 62c which are formed integrally with each other. The tool 50 has a proximal shank portion 51, and a distal cutting portion 52 which has six helical flutes 54 for facilitating the removal of cutting chips. The set of lower thread-milling teeth 56a and the set of upper thread-milling teeth 56b are provided by respective two annular protrusions formed at the distal end portion of the cutting portion 52. Each of these protrusions is divided by the six helical flutes 54 into six sections which are arranged in the circumferential direction of the cutting portion 52. These six sections of each protrusion have respective six thread-milling teeth 56a, 56b such that the cutting edge of each of these teeth 56a, 56b faces in the rotating direction, as indicated in the bottom plan view of FIG. 7 which shows the six lower thread-milling teeth 56a. Like the thread-milling teeth 22a, 22b provided in the first embodiment, the thread-milling teeth 56a, 56b have a shape similar to the shape of a thread to be formed by the teeth 56a, 56b. The cutting portion 52 further has the three end-cutting edges 62a, 62b, 62c formed at its distal end face, as indicated in FIG. 7, for drilling a hole to be threaded or enlarging an already formed hole. These end-cutting edges 62a, 62b, 62c are arranged in the circumferential direction of the cutting portion 52, as also indicated in FIG. 7. These three end-cutting edges 62a, 62b, 62c have different radial lengths. The end-cutting edge 62a which has the largest radial length has an inner end almost aligned with the rotation axis C of the tool 50, so that the end-cutting edges 62a, 62b, 62c are capable of drilling a hole rather as well as enlarging an already formed hole. That is, the end-cutting edge 62a has a radially inner portion, which is not provided on the end-cutting edges 30, 30 of the first embodiment. Therefore, the end cutting edges 62 including the edge 62a can drill a hole by a rotary motion and an axial motion of the tool 50, without an orbital motion thereof.

Like the end-cutting edges 30 in the first embodiment of FIGS. 1–3, the end-cutting edges 62a, 62b, 62c are contiguous with the set of lower end-cutting teeth 56a, and have a positive concavity angle α, which may be zero and is preferably within a range of 1°–10°. The radial distance $R_C$ of the boundary point R of the end-cutting edges 62 is larger than the minor radius $R_V$ of the thread-milling teeth 56a, 56b and smaller than the major radius $R_M$ of the teeth 56a, 56b, as in the first embodiment of FIGS. 1–3. Therefore, the drilling and thread-milling tool 50 according to this second embodiment of the invention is also effective to minimize the wall thickness S (FIG. 4) between the major diameter of the thread 42 and the edge of the workpiece 44, like the tool 10 of the first embodiment.

The tool 50 is also effective to minimize the thickness T (FIG. 4) of the bottom wall of the threaded hole, since the lower thread-milling teeth 56a at the foremost end of the tool body 52 are formed contiguously with the end-cutting edges 62a, 62b, 62c such that the edges 62 extend in the radial direction, and no peripheral cutting edge is provided adjacent to the end-cutting edges 62. The minimum required bottom wall thickness T can be further reduced owing to the flat or convex bottom surface of the threaded hole, since the end-cutting edges 62 has a positive concavity angle α, which may be zero and is preferably within the range of 1°–10°.

The tool 50 of the present second embodiment of FIGS. 5 and 6 has the lower set of six thread-milling teeth 56a, the upper set of six thread-milling teeth 56b, and the set of three end-cutting edges 62. Accordingly, the amount of stock removal per one tooth 56 or edge 62 is considerably smaller than that of the tool 10, which has the lower set of two thread-milling teeth 22a, the upper set of two thread-milling teeth 22b, and the set of two end-cutting edges 30. The present arrangement is effective to reduce the cutting resistance per tooth 56 or edge 62, and consequently improves the machining efficiency of the tool 50. In the present embodiment, too, a coolant feed passage 58 is formed in the tool body 51 such that the passage 58 extends through the shank portion 51 along the axis C and is open in the proximal end face of the shank portion 51 remote from the cutting portion 52. The passage 58 is bifurcated and open at two positions in the distal end face of the cutting portion 52. The passage 58 permits a sufficient supply of a coolant to the teeth 56a, 56 and the cutting edges 62.

In the present drilling and thread-milling tool 50, at least the thread-milling teeth 56a, 56b and the end-cutting edges 62 are formed of a suitable material selected from among high-speed tool steels, micro-grain cemented carbides, cemented carbides, cermets, ceramics, sintered diamond, and sintered CBN, for example. Alternatively, the teeth 56 and edges 62 may be coated with one or more layers of a material selected from among carbide of Ti, a mixture of carbide and nitride of Ti, aluminum nitride of Ti, diamond or CBN, for example. The thread-milling teeth 56 and end-cutting edges 62 therefore have considerably long life expectancy and high durability.

Figure 8:
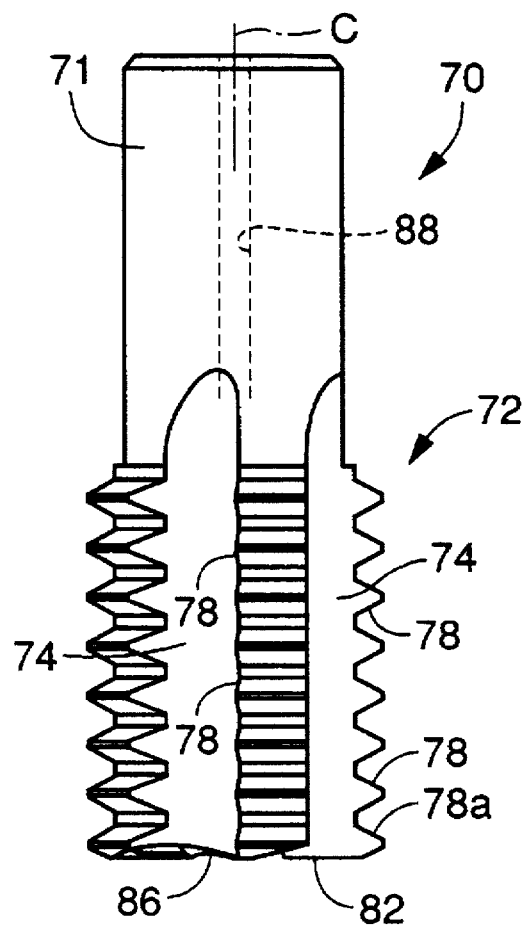
FIG. 8 is a view corresponding to that of FIG. 1, showing a drilling and thread-milling tool according to a further embodiment of the invention.
Figure 9:
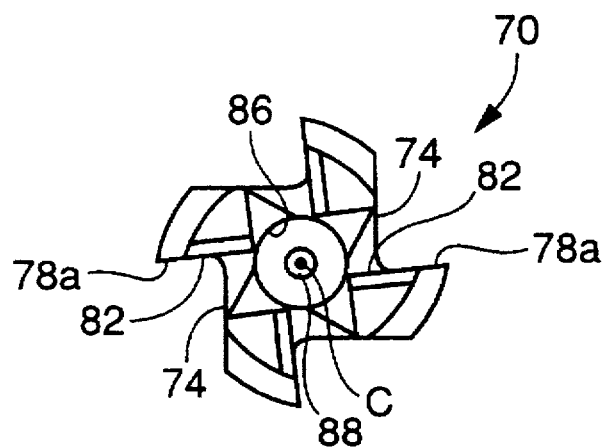
FIG. 9 is a bottom plan end of the tool of FIG. 8.
Figure 10:
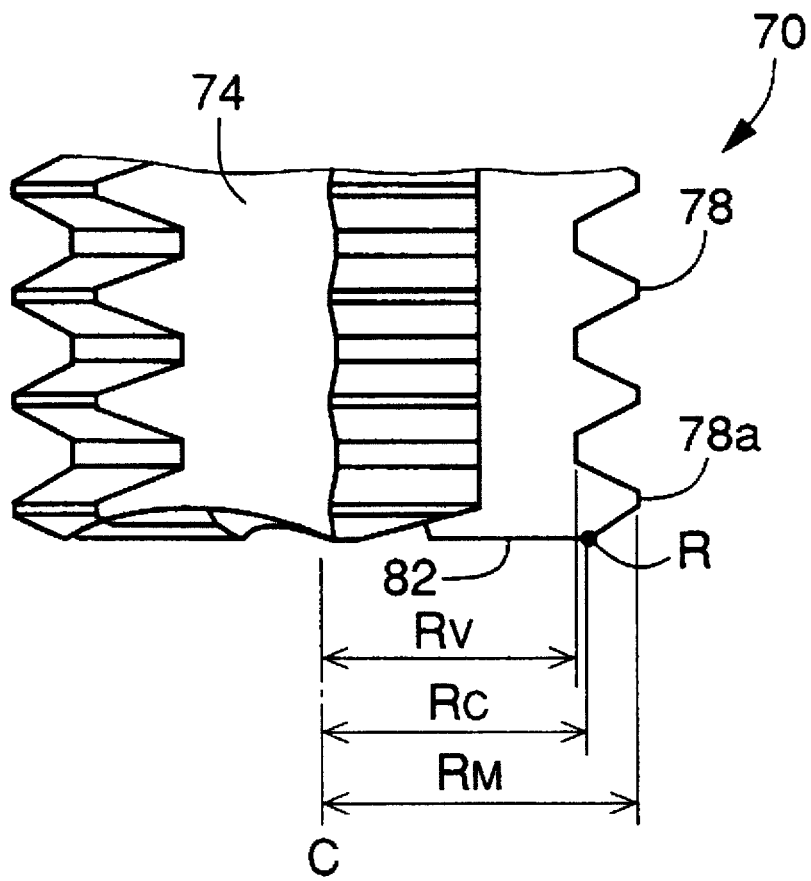
FIG. 10 is an enlarged view for explaining the configurations of the thread-milling teeth of the tool of FIG. 8 and end-cutting edges contiguous with the thread-milling teeth.

Referring next to FIGS. 8–10, there is shown a drilling and thread-milling tool 70 constructed according to a third embodiment of the present invention. The tool 70 consists of a proximal shank portion 71, and a distal cutting portion 72 which has eight sets of thread-milling teeth 78 integrally formed on its outer circumferential surface such that the eight sets of the teeth 78 are evenly arranged in the axial direction of the tool 70 over the entire axial length of the cutting portion 72. Described more specifically, the cutting portion 72 has four straight flutes 74 for facilitating the removal of cutting chips, and the eight sets of thread-milling teeth 78 are provided by respective eight annular protrusions formed on the outer circumferential surface. Each of eight these protrusions is divided by the four straight flutes 74 into four sections which are arranged in the circumferential direction of the cutting portion 72. These four sections of each protrusion have respective four thread-milling teeth 78 such that the cutting edge of each of these teeth 78 faces in the rotating direction, as indicated in the bottom plan view of FIG. 9 which shows the four foremost set of thread-milling teeth 78a. Like the thread-milling teeth 22a, 22b provided in the first embodiment, the thread-milling teeth 78 have a shape similar to the shape of a thread to be formed by the teeth 78. Thus, the eight sets of thread-milling teeth 78 are equally spaced apart from each other in the axial direction of the cutting portion 72, and the four thread-milling teeth 78 of each set are equally spaced apart from each other in the circumferential direction of the cutting portion 72.

The cutting portion 72 further has the four end-cutting edges 82 formed at its distal end face, as indicated in FIG. 9, for drilling a hole in the workpiece or enlarging a hole already formed in the workpiece. These end-cutting edges 82 are arranged in the circumferential direction of the cutting portion 72, as also indicated in FIG. 9. Like the end-cutting edges 30 of FIGS. 103, these three end-cutting edges 82 have a positive concavity angle α which may be zero and is preferably within a range of 1°–10°. The end-cutting edges 82 are contiguous with the lowermost or foremost set of thread-milling teeth 78a. The radial distance $R_C$ of the boundary point R of the end-cutting edges 82 is larger than the minor radius $R_V$ of the thread-milling teeth 78 and is smaller than the major radius $R_M$ of the teeth 78, as indicated in FIG. 10. The cutting portion 72 has a circular recess 86 formed in its distal end face, as shown in FIG. 9, such that the recess 86 has a center on the axis C. The tool body 71 has a coolant feed passage 88 formed along the axis C. This passage 88 is open in the circular recess 86.

Figure 11:
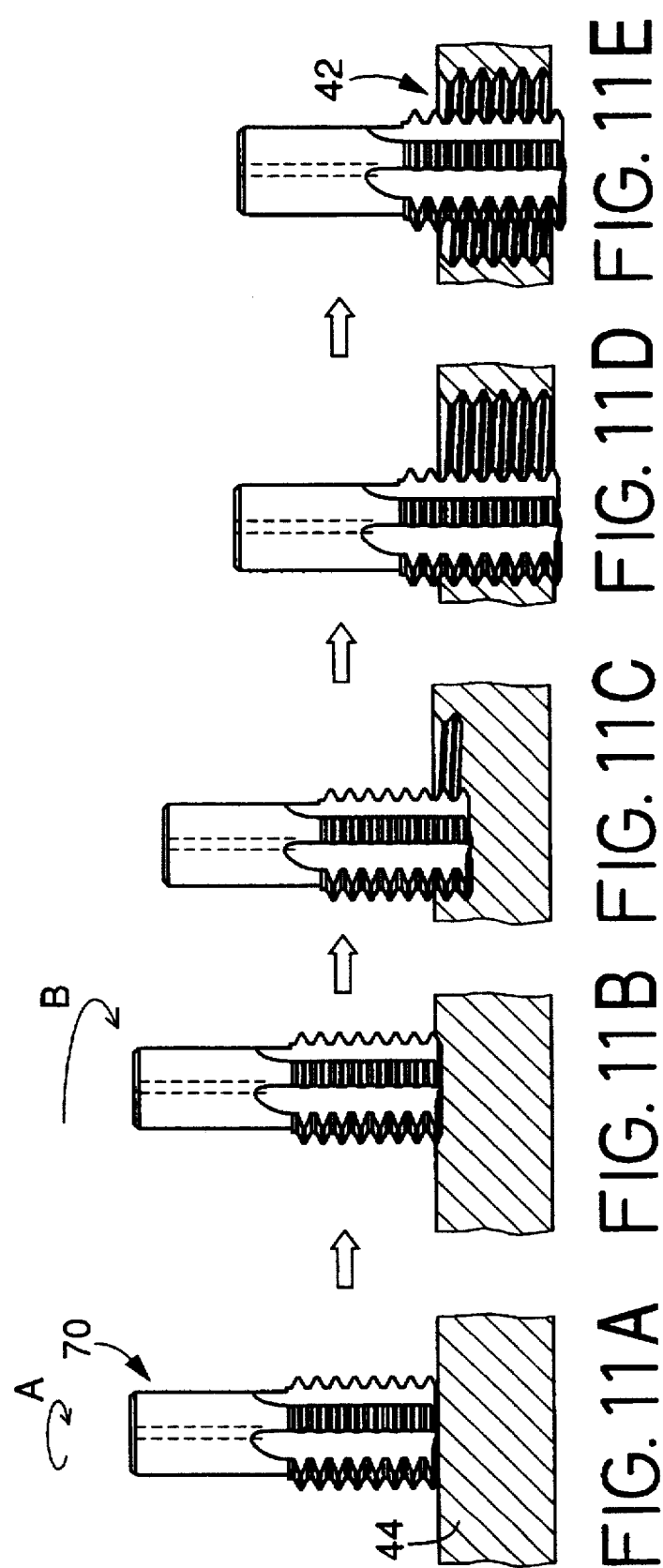
FIGS. 11A through 11E are elevational views showing a five-step process of a drilling and thread-milling operation by the drilling and thread-milling tool of FIG. 8.
Figure 12:
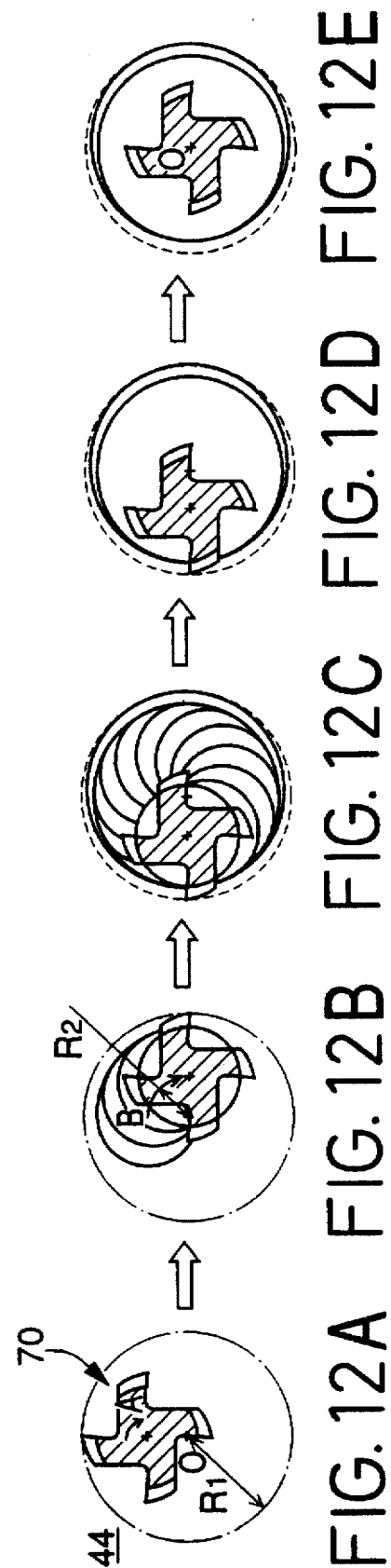
FIGS. 12A through 12E are top plan views showing the drilling and thread-milling operation of FIGS. 11A–11E.

The drilling and thread-milling tool 70 of the third embodiment of FIGS. 8 and 9 is used in the same manner as the tools 10, 50 of the first and second embodiments having two sets of thread-milling teeth 22a, 22b, 56a, 56b. Conventionally, a thread having multiple turns is formed by inserting a thread-milling tool with multiple thread-milling teeth in a hole already formed in the the workpiece, and performing one complete orbit of the axis of the rotating tool for thereby cutting the thread on the inner surface of the already formed hole such that all thread-milling teeth effect the thread-milling operation during one orbital motion of the tool through 360°. Where the internal thread 42 having multiple turns is generated by the present drilling and thread-milling tool 70, as indicated in FIGS. 11 and 12, a hole is drilled in the workpiece 44 by the end-cutting edges 82 while at the same time the thread 42 is generated by the thread-milling teeth 78 on the inner surface of the drilled hole. In this case, the machining operation by the tool 70 is performed such that the tool 70 is advanced in the axial distance by a distance equal to the pitch of the thread 42 during each complete orbital motion of the tool 70 about the centerline of the thread 42, so that a plurality of orbital motions of the tool 70 are required to complete the cutting of the thread 42 having multiple turns. That is, the number of the orbits of the tool 70 about the centerline of the thread 42 is equal to the number of the turns of the thread 42.

The cross sectional views of FIGS. 11A through 11E show different operating positions or states of the drilling and thread-milling tool 70 when the female thread 42 is cut through the thickness of the workpiece 42. The top plan views of FIGS. 12A through 12E correspond to the cross sectional view of FIGS. 11A through 11E, respectively. FIGS. 11E and 12E show the tool 70 which is located at the centerline O of the thread 42 after the thread 42 has been generated and before the tool 70 is removed from the threaded hole. In other words, the tool 70 is moved from the position of FIGS. 11D and 12D at the end of the machining operation to the centerline of the threaded hole, to avoid an interference with the generated thread 42 when the tool 70 is removed from the workpiece 44. It is noted that a multiple thread can be generated by advancing the tool 70 in the axial direction by a distance equal to a multiple of the pitch of the teeth 78 per one orbit of 360° of the tool 70 about the centerline O.

It will be understood from the above explanation of the third embodiment that the drilling and thread-milling tool 70 does not require a drilling operation prior to and independently of a thread-milling operation to form the thread 42, and eliminates otherwise required changing of the tools. Further, the same tool 70 permits the thread 42 to be formed with different diameters, in either a through-hole or a blind hole. In addition, the drilling and thread-milling tool 70 makes it possible to reduce the required minimum wall thickness S (FIG. 4) between the major diameter (diameter of the root) of the thread 42 and the edge of the workpiece, since the radial distance $R_C$ of the end-cutting edges 82 is larger and smaller than the minor radius $R_V$ and the major radius $R_M$ of the thread-milling edges respectively.

Another advantage of the tool 70 is derived from a fact that the stock removal to generate the thread 42 is effected primarily by the foremost or lowermost set of thread-milling teeth 78a, and that the other sets of thread-milling teeth 78 are assigned to finish the thread 42. Namely, the teeth 78 other than the foremost set 78a function to improve the surface finish of the thread 42, as compared with that of the thread generated by the tools 50 having only two sets of thread-milling teeth 22, 56 and that of the thread generated by the conventional tool having multiple teeth. Further, the tool 70 has a relatively long service life, since the thread-milling teeth 78 other than the foremost teeth 78a primarily function to generate the thread after the foremost teeth 78a have been worn out. In addition, only the foremost teeth 78a is subject to a relatively large cutting resistance, and the bending stress acting on the tool 70 is considerably reduced and held substantially constant after the initial portion of the thread 42 has been generated over the one-pitch length by the foremost teeth 78a. Accordingly, the tendency of deflection or bending of the tool body 71 during the machining operation with the orbital motion explained above is significantly reduced, leading to increased cylindricity of the threaded hole.

Figure 13:
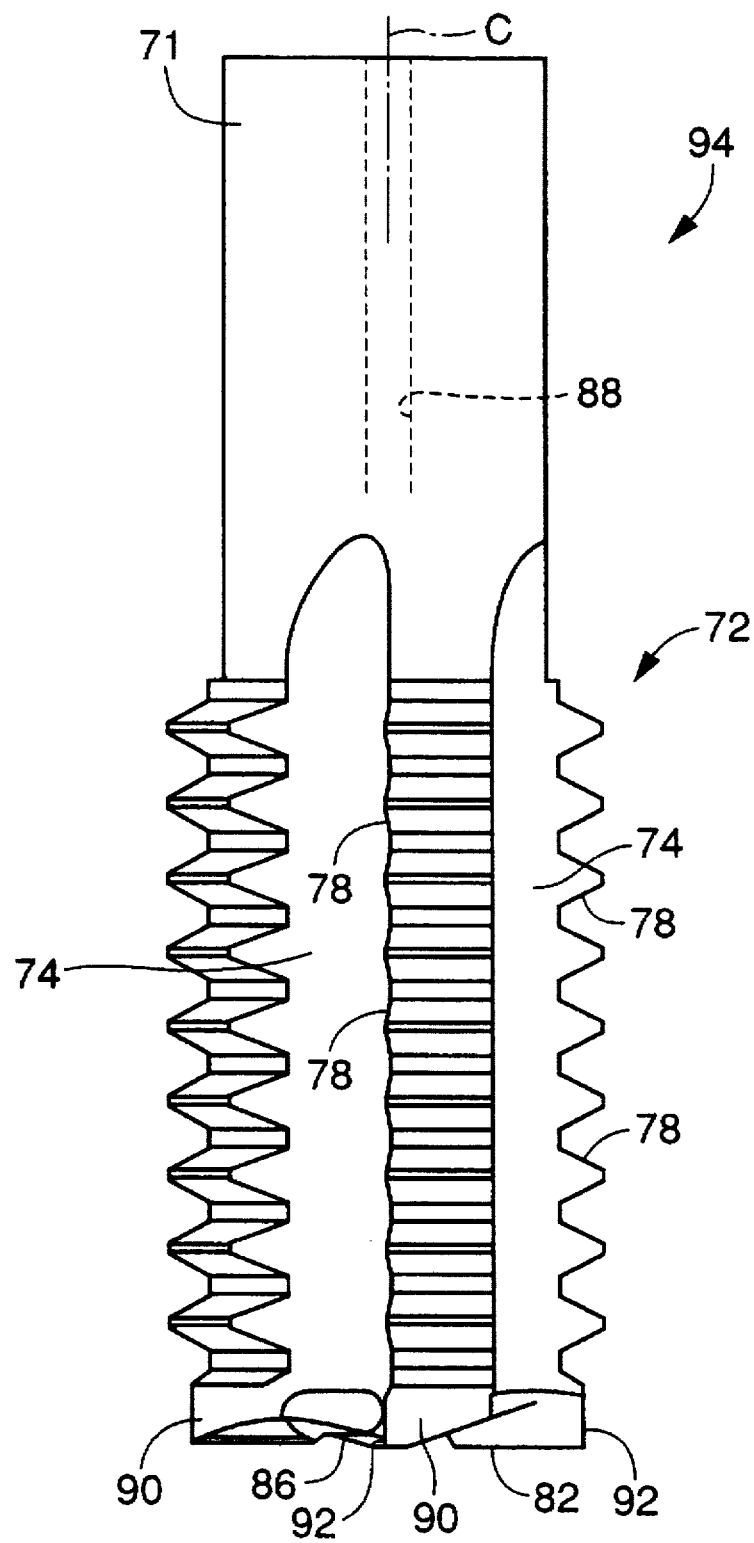
FIG. 13 is a view corresponding to that of FIG. 1, showing a drilling and thread-milling tool according to a still further embodiment of this invention.

A further advantage of the tool 70 of the present third embodiment of FIGS. 8 and 9 accrues from the arrangement wherein the foremost set of thread-milling teeth 78a is contiguous with the end-cutting edges 82, and peripheral cutting edges as indicated at 92 in FIG. 13 are not provided at the distal end portion of the tool. This arrangement is effective to reduce the length of a non-threaded portion near the bottom wall of the threaded hole, and is accordingly effective to reduce the minimum required thickness T (FIG. 4) of the bottom wall of the hole. The minimum required bottom wall thickness T can be further reduced owing to the flat or convex bottom surface of the threaded hole, since the end-cutting edges 82 have a positive concavity angle α, which may be zero and is preferably within the range between 1° and 10°.

A still further advantage of the tool 70 is provided by the circular recess 86 which is formed in the central region of the distal end face of the cutting portion 72 and in which the coolant feed passage 88 is open. The provision of the recess 86 reduces the resistance to flows of the coolant to the portion of the workpiece being machined, leading to improved machining condition.

In the present tool 70, the eight sets of thread-milling teeth 78 are formed as integral part of the cutting portion 72 on its outer circumferential surface such that the eight sets are equally arranged in the axial direction of the tool 70. This tool 70 can be used to generate a threaded hole in a pre-drilling fashion different from the simultaneous drilling and thread-milling fashion as described above by reference to FIGS. 11 and 12. In the pre-drilling fashion, a hole already formed in the workpiece (e.g., a hole formed during casting of the workpiece) is first enlarged to a desired diameter by advancing the tool 70 in the axial direction while the tool 70 is rotated about its axis C, until the enlarged hole has a desired depth. Then, the tool 70 rotating about its axis C is moved about the centerline O of the enlarged hole by at least one orbit, for generating a thread on the inner surface of the enlarged hole in a relatively short time without axially moving the tool 70 over the entire length of the hole.

As in the second embodiment, at least the thread-milling teeth 78 and the end-cutting edges 82 are formed of a material such as high-speed tool steels, micro-grain cemented carbides, cemented carbides, cermets, ceramics, or sintered diamond or CBN, for example. Alternatively, the teeth 78 and edges 82 may be coated with one or more layers of a material selected from among carbide of Ti, a mixture of carbide and nitride of Ti, an aluminum nitride of Ti, diamond or CBN, for example. The thread-milling teeth 78 and end-cutting edges 82 therefore have considerably long life expectancy and high durability.

Figure 14:
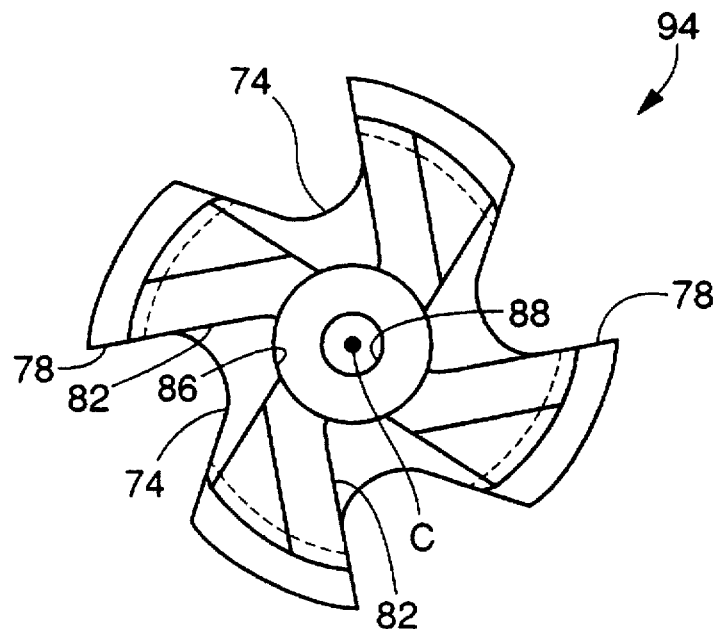
FIG. 14 is a bottom plan view of the tool of FIG. 13.

Referring to FIGS. 13 and 14, there is shown a drilling and thread-milling tool 94 according to a fourth embodiment of the invention, which is identical with the tool 70 of FIGS. 8 and 9 except for the provision of a substantially cylindrical portion 90 at the distal end portion of the tool 94 and the nine sets of thread-milling teeth 78 (rather than the eight sets provided on the tool 70). The cylindrical portion 90 has a radius equal to the radial distance $R_C$ of the end-cutting edges 80 of the tool 70, and provides peripheral cutting edges 92 formed between the end-cutting edges 82 and the foremost thread-milling teeth 78a. The peripheral cutting edges 92 extend in the axial direction parallel to the axis C. Like the tool 70 of FIGS. 8 and 9, the tool 94 of FIGS. 13 and 14 has the circular recess 86 in the distal end face and the coolant feed passage 88 open in the recess 86.

In the present tool 94, too, the radial distance $R_C$ of the end-cutting edges 82 of the present tool 94 is larger than the minor radius $R_V$ of the teeth 78 and smaller than the major radius $R_M$ of the teeth 78, and the edges 82 have a positive concavity angle α, which may be zero and is preferably within the range of 1°–10°. Therefore, the minimum required wall thickness T (FIG. 4) can be reduced in the case where the axial dimension of the peripheral cutting edges 92 is smaller than that of each thread-milling teeth 78 as measured at the radial position at which the peripheral cutting edges 92 are located. Further, the tool 94 having the eight sets of thread-milling teeth 78 can be used to generate a threaded hole in the pre-drilling fashion described above, in which an already formed hole is first enlarged to a desired diameter by an axial movement of the rotating tool 94 to a desired depth, and then a thread cutting operation to generate the thread is performed by at least one orbit of the rotating tool 94 about the centerline O without axially moving the tool 94 over the entire length of the enlarged hole.

In the case where the axial dimension of the peripheral cutting edges 92 is larger than that of the thread-milling teeth 78 at the same radial position as the peripheral cutting edges 92, the tool 94 cannot be used to generate a threaded hole in the simultaneous drilling and thread-milling fashion as illustrated in FIGS. 11 and 12. In this case, therefore, the generation of a threaded hole by the tool 94 should be accomplished in the pre-drilling fashion.

Figure 15:
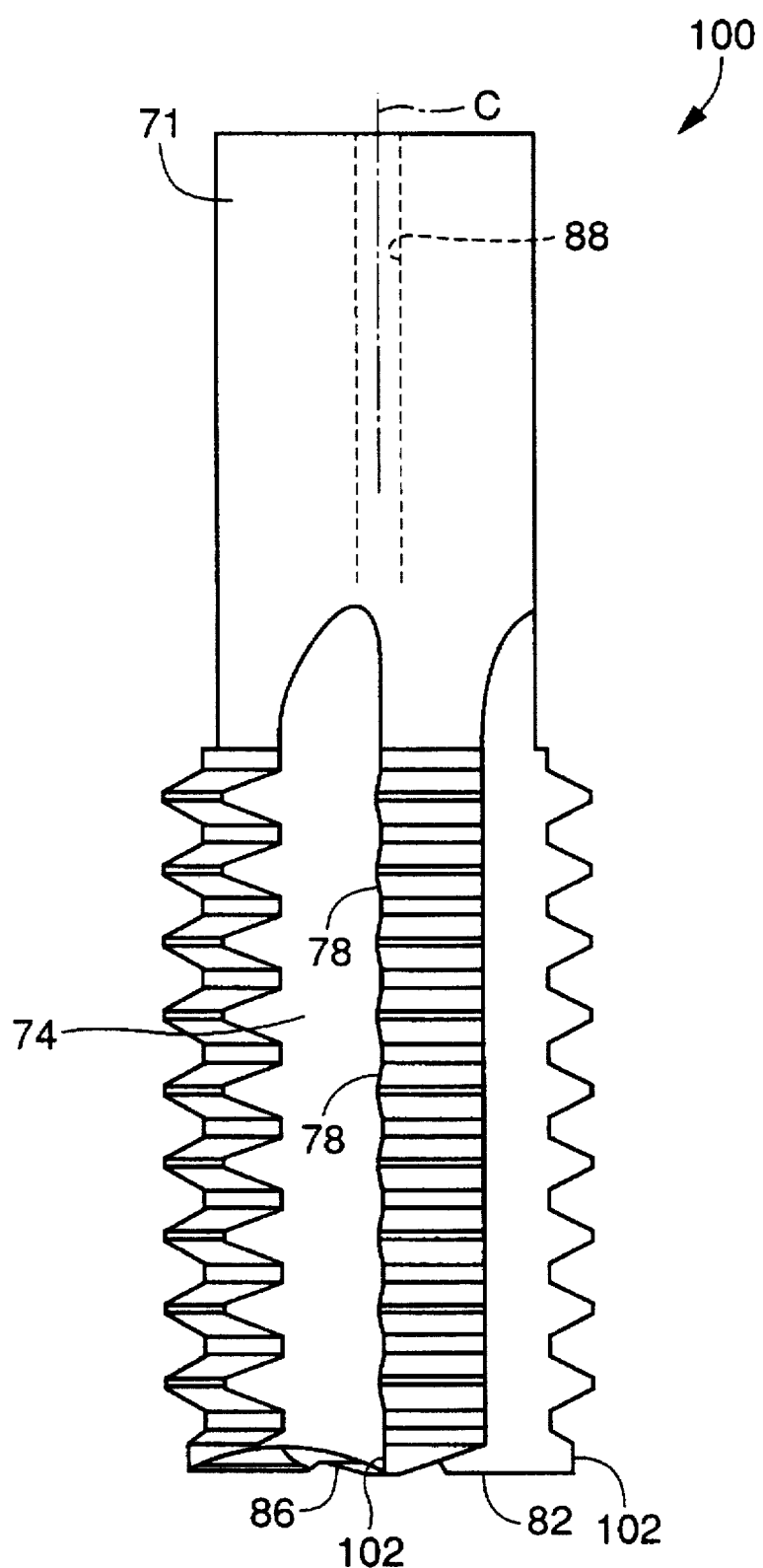
FIG. 15 is a view corresponding to that of FIG. 1, showing a drilling and thread-milling tool according to a yet further embodiment of the invention.

Referring to FIGS. 15, there is shown a drilling and thread-milling tool 100 constructed according to a fifth embodiment of this invention, which is identical with the tool 94 of FIGS. 13 and 14 except for the provision of peripheral cutting edges 92 whose axial dimension at the crest is equal to the axial dimension of each thread-milling tooth 78 as measured at the same radial position as the peripheral cutting edges 92. Like the tool 94, the tool 100 has the end-cutting edges 82, circular recess 86 and coolant feed passage 88. In the present embodiment, a total of ten sets of thread-milling teeth 78 are initially formed, and the tenth or foremost set of teeth 78 is utilized to provide the peripheral cutting edges 102. That is, the tip or crest portion of each tooth 78 of the foremost set is removed by cutting in a plane of a cylindrical surface of a cylinder whose diameter is smaller and larger than the major and minor diameters of the teeth 78 of the other eight sets, respectively. The tip or crest portion indicated above includes the crest of the thread-milling teeth 78 is indicated by broken line in FIG. 15. The axial dimension of the top face or crest of the thus formed peripheral cutting edges 102 is equal to that of the thread-milling teeth 78 as measured as the same diameter as the above-indicated top face.

In the present tool 100, too, the radial distance $R_C$ of the end cutting edges 82 is larger than the minor and major radii $R_V$ and $R_M$ of the thread-milling teeth 78, and the end cutting edges 82 have a positive concavity angle α, which may be zero and is preferably within the range of 1°–10°. Accordingly, the tool 100 makes it possible to reduce the minimum required wall thickness values S and T. Further, the tool 100 having the multiple teeth 78 can be used to generate a threaded hole with high efficiency, in the pre-drilling fashion explained above.

The tool 100 can also be used to generate a threaded hole in the simultaneous drilling and thread-milling fashion as illustrated in FIGS. 3 and 4 and FIGS. 11 and 12, since the axial dimension of the peripheral cutting edges 102 at their top faces or crests is equal to that of the thread-milling edges 78 as measured at the same diametric position as the peripheral cutting edges 102. As mentioned above, only the pre-drilling fashion may be adopted if the axial dimension of the peripheral cutting edges is larger than that of the thread-milling edges 78 as in one form of the tool 94 of the embodiment of FIG. 13 provided with the peripheral cutting edges 95.

It is noted that the peripheral cutting edges 102 formed by cutting the foremost or tenth set of thread-milling edges 78 may be considered to also function as thread-milling edges having a smaller height than the other thread-milling edges 78. This arrangement reduces the cutting load acting on the peripheral cutting edges or foremost thread-milling edges 102 during a machining operation with an axial movement thereof, resulting improved surface finish of the thread and prolonged service life of the tool.

Figure 16:
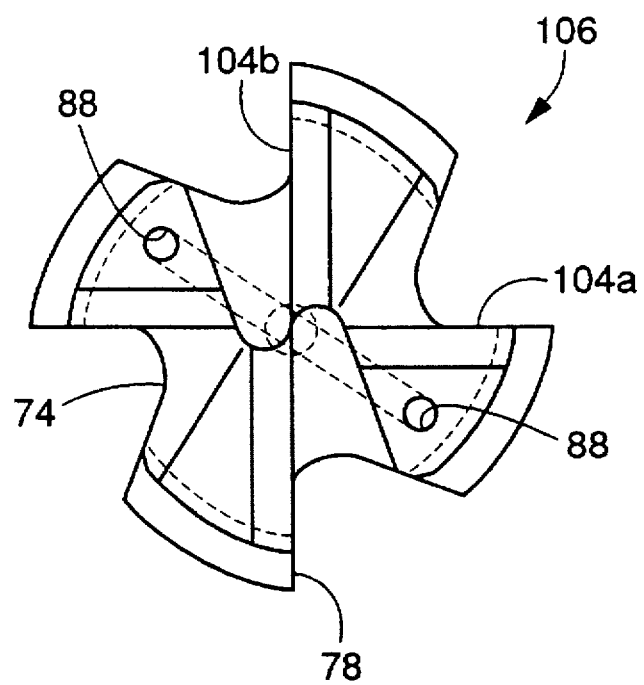
FIG. 16 is a bottom plan view of the tool of FIG. 15.

Referring to FIG. 16, there is shown one form of modification of the tools 70, 94, 100 of FIGS. 8, 13 and 15. That is, a drilling and thread-milling tool 106 of FIG. 16 has two relatively short end-cutting edges 104a and two relatively long end-cutting edges 104b, which are alternately arranged in the circumferential direction of the tool. These end-cutting edges 104 are provided to drill a hole or enlarge an already formed hole, when the tool 106 is axially moved. Since the radially inner end of each relatively long end-cutting edge 104b is almost aligned with the axis C, the tool 106 is capable of drilling a hole by an axial motion of the rotating tool without an orbital motion of the tool. Accordingly, the present tool 100 does not require an already formed hole, and can generate a threaded hole in the pre-drilling fashion in which a hole is first drilled and then a thread-milling operation is performed by an orbital motion of the tool about the centerline of the drilled hole.

Like the end-cutting edges 82 shown in FIGS. 8 and 9 and FIGS. 12 and 14, the end-cutting edges 104a, 104b of FIG. 16 has a positive concavity angle $\alpha$ which may be zero and is preferably within the range of 1°–10°, and are formed contiguously with the foremost thread-milling teeth 78 (78a) or peripheral cutting edges 92, 102. Further, the end-cutting edges 104 have a radial distance, $R_C$ which is larger and smaller than the minor and major radii $R_V$, $R_M$ of the thread-milling teeth 78, as indicated in FIG. 10. Accordingly, the minimum required thickness values S and T can be significantly reduced, as in the preceding embodiments.

In the drilling and thread-milling tool 106, too, the coolant feed passage 88 is formed so as to be open at two positions in the distal end face of the cutting portion 72, as shown in FIG. 16.

In the embodiments of FIGS. 12–16, too, at least the thread-milling teeth 78 and end-cutting edges 82, 104a, 104 are formed of a material such as high-speed tool steels, micro-grain cemented carbides, cemented carbides, cermets, ceramics, or sintered diamond or CBN, for example. Alternatively, the teeth 78 and edges 82, 104a, 104b may be coated with one or more layers of a material selected from among carbide of Ti, a mixture of carbide and nitride of Ti, an aluminum nitride of Ti, diamond or CBN, for example. The thread-milling teeth 78 and end-cutting edges 82, 104a, 104b therefore have considerably long life expectancy and high durability.

In the case where the positive concavity angle $\alpha$ of the end-cutting edges 62, 82, 104 of the tools 50, 70, 94, 100, 106 of FIGS. 6–16 is zero, these end-cutting edges may be re-shaped by grinding the distal end face of the cutting portion 52, 72 in a plane perpendicular to the axis C.

While the several presently preferred embodiments of this invention have been described above in detail by reference to the drawings, it is to be understood that the invention is not limited to the details of the illustrated embodiments, but may be otherwise embodied.

In the illustrated embodiments, the two or more end-cutting edges 30, 62, 82, 104 are formed on the distal end face of the cutting portion 20, 52, 72 of the tool 10, 50, 70, 94, 100, 106. However, only one or at least one end-cutting edge may be provided on the distal end face of the cutting portion.

In the thread-milling operation by the tool 10 explained above by reference to FIGS. 4 and 5, in particular, the tool 10 rotating about the axis C in the direction A is moved around the centerline O of the hole in the same direction B as the rotating direction A. In this case, the right-handed thread 42 is formed. When a left-handed thread is desired, the direction of the orbital motion of the tool 10 about the centerline O should be reversed. That is, the axis C of the tool should be moved about the centerline O in the direction opposite to the direction B. This also applies to the tools 50, 70, 94, 100 and 106.

In the illustrated embodiments, the tool 10, 50, 70, 94, 100, 106 rotating about its axis C is moved axially moved and moved about the centerline O relative to the stationary workpiece 44, the workpiece 44 may be moved relative to the tool which is rotating about the axis C and which is fixed in position.

While the thread-milling teeth 56, 78 and end- and peripheral cutting edges 62, 82, 92, 102, 104 of the tools 50, 70, 94, 100, 106 are formed integrally with the cutting portion 52, 72, these teeth and edges may take the form of inserts which are removably attached to the cutting portion, like the inserts 14, 16 provided on the tool 10 of the first embodiment.

Although the two sets of thread-milling teeth 22a, 11b, 56a, 56b are provided on the tool 10, 50, three or more sets of thread-milling teeth may be provided. However, the provision of at least two sets of thread-milling teeth is essential since the thread-milling teeth of the foremost set provide the end-cutting edges (e.g., 30) and are incomplete in shape because the radial distance $R_C$ of the end-cutting edges is larger and smaller than the minor and major radii $R_V$ and $R_M$ of the teeth (e.g., teeth 22), respectively, and since the tread-cutting teeth of the other set or sets are complete in shape.

The tools 70, 94, 100, 106 may have a few sets of thread-milling teeth formed in the distal end region of the cutting portion 72.

The peripheral cutting edges 102 of FIG. 15 may be modified such that the axial dimension of these edges 102 as measured at the top face or crest is smaller than that of the thread-milling edges 78 as measured at the same radial or diametric position as the top face of the peripheral cutting edges 102.

In the tool 100 of FIG. 15, only one set of peripheral cutting edges 102 is provided by cutting the crest portions of the initially formed thread-milling teeth of the foremost set. However, two or more sets of peripheral cutting edges may be provided by cutting the crest portion of the initially formed thread-milling teeth of the two or more successive sets including the foremost set. In this case, these two or more sets of peripheral cutting edges have different height dimensions of the crests from the roots of the thread-milling teeth). More specifically described, the foremost set has the smallest height dimension, and the height dimensions of the other set or sets increase in the direction from the foremost set toward the rearmost one. The two or more sets of peripheral cutting edges indicated above may be considered as incomplete thread-milling teeth.

It is to be understood that the present invention may be embodied with various other changes, modifications and improvements, which may occur to those killed in the art, without departing from the spirit and scope of the invention defined in the following claims.

What is claimed is:

1. A drilling and thread-milling tool for generating an internal thread in a workpiece, comprising:

a proximal shank portion attachable to driving means for rotating the tool about a rotation axis thereof; and a distal cutting portion rotated with said shank portion about said rotation axis for generating said internal thread while said distal cutting portion is moved relative to said workpiece, said distal cutting portion having at least one thread-milling tooth on an outer circumferential surface thereof, each of said at least one thread-milling tooth having a configuration corresponding to that of said internal thread, and having a height substantially equal to a depth of said internal thread, said distal cutting portion further having at least one end-cutting edge on a distal end face thereof so as to extend in a radial direction thereof, each of said at least one end-cutting edge having a maximum diameter which is larger than a minor diameter of said at least one thread-milling tooth and is smaller than a major diameter of said at least one thread-milling tooth.

2. A drilling and thread-milling tool according to claim 1, wherein said at least one end-cutting edge is contiguous with one of said at least one thread-milling tooth which is closest to said distal end face of said distal cutting portion in an axial direction of the tool.

3. A drilling and thread-milling tool according to claim 1, wherein said distal cutting portion further has at least one peripheral cutting edge extending in a direction substantially parallel to an axial direction of the tool, said at least one peripheral cutting edge being contiguous with one of said at least one thread-milling tooth which is closest to said distal end face of said distal cutting portion in said axial direction, said at least one end-cutting edge being contiguous with said at least one peripheral cutting edge.

4. A drilling and thread-milling tool according to claim 1, wherein said at least one end-cutting edge comprises at least one end-cutting edge whose inner end is located close to said rotation axis.

5. A drilling and thread-milling tool according to claim 1, wherein said at least one thread-milling tooth consists of a plurality of thread-milling teeth provided on said circumferential surface of said distal cutting portion such that said plurality of thread-milling teeth are equally spaced apart from each other in an axis direction of the tool.

6. A drilling and thread-milling tool according to claim 3, wherein said at least one thread-milling tooth comprises a foremost thread-milling tooth which is closest to said distal end face of said distal cutting portion in an axial direction of the tool, said at least one peripheral cutting edge being formed by removing a crest portion of said foremost thread-milling tooth which crest portion includes a crest of said foremost thread-milling tooth, said crest portion being removed by cutting in a plane of a cylindrical surface of a cylinder having an axis parallel to said rotation axis.

7. A drilling and thread-milling tool according to claim 1, wherein said at least one thread-milling tooth comprises a plurality of thread-milling teeth provided in a distal end portion of said outer circumferential surface of said distal cutting portion such that plurality of thread-milling teeth are equally spaced apart from each other in an axis direction of the tool, height dimensions of crests of said plurality of thread-milling teeth as measured from roots of said teeth being determined so as to increase in an axial direction from said distal end face of said distal cutting portion toward said proximal shank portion.

8. A drilling and thread-milling tool according to claim 1, wherein each of at least one end-cutting edge has a positive concavity angle with respect to a plane perpendicular to said rotation axis of the tool, such that an inner end of said each end-cutting edge as viewed in said radial direction of said distal cutting portion is not offset from an outer end of said each end-cutting edge as viewed in said radial direction, in an axial direction of the tool from said proximal shank portion toward said distal cutting portion.

9. A drilling and thread-milling tool according to claim 8, wherein said positive concavity angle is zero.

10. A drilling and thread-milling tool according to claim 8, wherein said positive concavity angle is held within a range between 1° and 10°.

11. A drilling and thread-milling tool according to claim 1, wherein said at least one thread-milling tooth and said at least one end-cutting edge are formed of a material selected from the group consisting of: high-speed tool steels; micrograin cemented carbides; cemented carbides; cermets; ceramics; sintered diamond; and sintered CBN (cubic boron nitride).

12. A drilling and thread-milling tool according to claim 1, wherein said at least one thread-milling tooth and said at least one end-cutting edge are coated with at least one layer of a material selected from the group consisting of: carbide of Ti; a mixture of carbide and nitride of Ti; aluminum nitride of Ti; diamond; and CBN (cubic boron nitride).

13. A drilling and thread-milling tool for generating an internal thread in a workpiece, comprising:

a proximal shank portion attachable to driving means for rotating the tool about a rotation axis thereof;

a distal cutting portion rotated with said shank portion about said rotation axis for generating said internal thread while said distal cutting portion is moved relative to said workpiece;

at least one cutting insert fixed on said distal cutting portion, and each of said at least one cutting insert including at least two thread-milling teeth which protrude from an outer circumferential surface of said distal cutting portion, each of said at least two thread-milling teeth having a configuration corresponding to that of said internal thread, and having a height substantially equal to a depth of said internal thread, said each cutting insert further including an end-cutting edge at a distal end of said distal cutting portion, said end-cutting edge extending in a radial direction of said distal cutting portion and being contiguous with said at least two thread-milling teeth, said end-cutting edge having a maximum diameter which is larger than a minor diameter of said at least two thread-milling teeth and smaller than a major diameter of said at least two thread-milling teeth; and fixing means for fixing said at least two cutting inserts to said distal cutting portion.

14. A drilling and thread-milling tool for generating an internal thread in a workpiece, comprising:

a proximal shank portion attachable to driving means for rotating the tool about a rotation axis thereof; and a distal cutting portion rotated with said shank portion about said rotation axis for generating said internal thread while said distal cutting portion is moved relative to said workpiece, said distal cutting portion having at least one thread-milling tooth integrally formed on an outer circumferential surface thereof, each of said at least one thread-milling tooth having a configuration corresponding to that of said internal thread, and having a height substantially equal to a depth of said internal thread, said distal cutting portion further having at least one end-cutting edge integrally formed on a distal end face thereof such that said at least one end-cutting edge is contiguous with said at least one thread-milling tooth and extends in a radial direction thereof, each of said at least one end-cutting edge having a maximum diameter which is larger than a minor diameter of said at least one thread-milling tooth and is smaller than a major diameter of said at least one thread-milling tooth, said at least one end-cutting edge including at least one end-cutting edge whose inner end is located close to said rotation axis.

15. A drilling and thread-milling tool for generating an internal thread in a workpiece, comprising:

a proximal shank portion attachable to driving means for rotating the tool about a rotation axis thereof; and a distal cutting portion rotated with said shank portion about said rotation axis for generating said internal thread while said distal cutting portion is moved relative to said workpiece, said distal cutting portion having a plurality of thread-milling teeth which are integrally formed on an outer circumferential surface thereof and which are equally spaced apart from each other in an axial direction of the tool, each of said plurality of thread-milling teeth having a configuration corresponding to that of said internal thread, and having a height substantially equal to a depth of said internal thread, said distal cutting portion further having at least one end-cutting edge integrally formed on a distal end face thereof such that said at least one end-cutting edge is contiguous with said plurality of thread-milling teeth and extends in a radial direction thereof, each of said at least one end-cutting edge having a maximum diameter which is larger than a minor diameter of said at least one thread-milling tooth and is smaller than a major diameter of said at least one thread-milling tooth.

16. A drilling and thread-milling tool for generating an internal thread in a workpiece, comprising:

a proximal shank portion attachable to driving means for rotating the tool about a rotation axis thereof; and a distal cutting portion rotated with said shank portion about said rotation axis for generating said internal thread while said distal cutting portion is moved relative to said workpiece, said distal cutting portion having a plurality of thread-milling teeth which are integrally formed on an outer circumferential surface thereof and which are equally spaced apart from each other in an axial direction of the tool, each of said plurality of thread-milling teeth having a configuration corresponding to that of said internal thread, and having a height substantially equal to a depth of said internal thread, said distal cutting portion further having at least one end-cutting edge integrally formed on a distal end face thereof so as to extend in a radial direction thereof, each of said at least one end-cutting edge having a maximum diameter which is larger than a minor diameter of said plurality of thread-milling teeth and is smaller than a major diameter of said thread-milling teeth, said distal cutting portion further having at least one peripheral cutting edge extending in a direction substantially parallel to an axial direction of the tool, said at least one peripheral cutting edge being contiguous with one of said plurality of thread-milling teeth which is closest to said distal end face of said distal cutting portion in said axial direction, said at least one end-cutting edge being contiguous with said at least one peripheral cutting edge.

17. A drilling and thread-milling tool according to claim 16, wherein said at least one end-cutting edge comprises at least one end-cutting edge whose inner end is located close to said rotation axis.

18. A drilling and thread-milling tool according to claim 16, wherein said plurality of thread-milling teeth comprise a plurality of thread-milling teeth having respective crests whose height dimensions as measured from roots thereof are determined so as to increase in said axial direction from said distal end face of said distal cutting portion toward said proximal shaft portion.

19. A drilling and thread-milling tool according to claim 16, wherein said plurality of thread-milling tooth comprise a foremost thread-milling tooth which is closest to said distal end face of said distal cutting portion in said axial direction, said at least one peripheral cutting edge being formed by removing a crest portion of said foremost thread-milling tooth which crest portion includes a crest of said foremost thread-milling tooth, said crest portion being removed by cutting in a plane of a cylindrical surface of a cylinder having an axis parallel to said rotation axis.

20. A drilling and thread-milling tool according to claim 13, wherein said proximal shank portion and distal cutting portion cooperate to define a coolant feed passage formed therethrough such that said coolant feed passage extends through said proximal shank portion along said rotation axis and is branched so that said coolant feed passage is open in said distal end face of said distal cutting portion, at positions ahead of said at least one end-cutting edge as viewed in a direction of rotation of said distal cutting portion about said rotation axis.

21. A drilling and thread-milling tool according to claim 14, wherein said proximal shank portion and distal cutting portion cooperate to define a coolant feed passage formed therethrough such that said coolant feed passage extends through said proximal shank portion along said rotation axis and is branched so that said coolant feed passage is open in said distal end face of said distal cutting portion, at positions ahead of said at least one end-cutting edge as viewed in a direction of rotation of said distal cutting portion about said rotation axis.

22. A drilling and thread-milling tool according to claim 15, wherein said proximal shank portion and distal cutting portion cooperate to define a coolant feed passage formed therethrough such that said coolant feed passage extends through said proximal shank portion along said rotation axis and is branched so that said coolant feed passage is open in said distal end face of said distal cutting portion, at positions ahead of said at least one end-cutting edge as viewed in a direction of rotation of said distal cutting portion about said rotation axis.

23. A drilling and thread-milling tool according to claim 16, wherein said proximal shank portion and distal cutting portion cooperate to define a coolant feed passage formed therethrough such that said coolant feed passage extends through said proximal shank portion along said rotation axis and is branched so that said coolant feed passage is open in said distal end face of said distal cutting portion, at positions ahead of said at least one end-cutting edge as viewed in a direction of rotation of said distal cutting portion about said rotation axis.

24. A drilling and thread-milling tool according to claim 13, wherein said at least two thread-milling teeth and said one end-cutting edge are formed of a material selected from the group consisting of: high-speed tool steels; micro-grain cemented carbides.; cemented carbides; cermets; ceramics; sintered diamond; and sintered CBN (cubic boron nitride).

25. A drilling and thread-milling tool according to claim 13, wherein said at least two thread-milling teeth and said end-cutting edge are coated with at least one layer of a material selected from the group consisting of: carbide of Ti; a mixture of carbide and nitride of Ti; aluminum nitride of Ti; diamond; and CBN (cubic boron nitride).

26. A drilling and thread-milling tool according to claim 14, wherein said at least one thread-milling tooth and said at least one end-cutting edge are formed of a material selected from the group consisting of: high-speed tool steels; micro-grain cemented carbides; cemented carbides; cermets; ceramics; sintered diamond; and sintered CBN (cubic boron nitride).

27. A drilling and thread-milling tool according to claim 14, wherein said at least one thread-milling tooth and said at least one end-cutting edge are coated with at least one layer of a material selected from the group consisting of: carbide of Ti; a mixture of carbide and nitride of Ti; aluminum nitride of Ti; diamond; and CBN (cubic boron nitride).

28. A drilling and thread-milling tool according to claim 15, wherein said plurality of thread-milling teeth and said at least one end-cutting edge are formed of a material selected from the group consisting of: high-speed tool steels; micro-grain cemented carbides; cemented carbides; cermets; ceramics; sintered diamond; and sintered CBN (cubic boron nitride).

29. A drilling and thread-milling tool according to claim 15, wherein said plurality of thread-milling teeth and said at least one end-cutting edge are coated with at least one layer of a material selected from the group consisting of: carbide of Ti; a mixture of carbide and nitride of Ti; aluminum nitride of Ti; diamond; and CBN (cubic boron nitride).

30. A drilling and thread-milling tool according to claim 16, wherein said plurality of thread-milling teeth, said at least one end-cutting edge and said at least one peripheral cutting edge are formed of a material selected from the group consisting of: high-speed tool steels; micro-grain cemented carbides; cemented carbides; cermets; ceramics; sintered diamond; and sintered CBN (cubic boron nitride).

31. A drilling and thread-milling tool according to claim 16, wherein said plurality of thread-milling teeth, said at least one end-cutting edge and said at least one peripheral cutting edge are coated with at least one layer of a material selected from the group consisting of: carbide of Ti; a mixture of carbide and nitride of Ti; aluminum nitride of Ti; diamond; and CBN (cubic boron nitride).

* * * * *